United States Patent
Fukuda et al.

(10) Patent No.: US 10,840,848 B2
(45) Date of Patent: Nov. 17, 2020

(54) MOTOR DRIVER AND MOTOR DRIVING SYSTEM

(71) Applicant: FANUC CORPORATION, Yamanashi (JP)

(72) Inventors: Kai Fukuda, Yamanashi (JP); Ryou Matsuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 16/212,982

(22) Filed: Dec. 7, 2018

(65) Prior Publication Data

US 2019/0190435 A1     Jun. 20, 2019

(30) Foreign Application Priority Data

Dec. 19, 2017   (JP) ................................. 2017-242704

(51) Int. Cl.
  *B41J 23/00*     (2006.01)
  *H02P 29/68*     (2016.01)
  *G08B 21/18*     (2006.01)

(52) U.S. Cl.
  CPC ............ *H02P 29/68* (2016.02); *G08B 21/182* (2013.01)

(58) Field of Classification Search
  CPC ............................... G08B 21/182; H02P 29/68
  See application file for complete search history.

(56) References Cited

U.S. PATENT DOCUMENTS

| 2007/0242398 A1* | 10/2007 | Ogawa | B62D 5/04 361/33 |
| 2011/0095716 A1* | 4/2011 | Hanyu | H02P 29/60 318/473 |

(Continued)

FOREIGN PATENT DOCUMENTS

| CN | 102055395 | 5/2011 |
| JP | 5-284755 | 10/1993 |

(Continued)

OTHER PUBLICATIONS

Notification of Reasons for Refusal dated Nov. 5, 2019 in Japanese Patent Application No. 2017-242704.

(Continued)

*Primary Examiner* — Muhammad S Islam
(74) *Attorney, Agent, or Firm* — Wenderoth, Lind & Ponack, L.L.P.

(57) ABSTRACT

To provide a motor driver and a motor driving system which allow a reduction in power consumption of a heat exchanger provided in a power magnetics cabinet while keeping down manufacturing cost. A motor driver is accommodated in a power magnetics cabinet and drives a motor. The motor driver comprises: a storage unit that stores the quantity of heat generated independently of the value of a current I[Arms] caused to flow in the motor as a generated heat quantity a[W]; a current detection unit that detects the value of the current I[Arms] caused to flow in the motor; and a heat quantity calculation unit that calculates the quantity of heat P[W] released to the interior of the power magnetics cabinet by adding the heat quantity a[W] stored in the storage unit and a heat quantity q×K[W/Arms]×I[Arms] responsive to the value I[Arms] detected by the current detection unit.

6 Claims, 4 Drawing Sheets

(56) References Cited

U.S. PATENT DOCUMENTS

| | | | |
|---|---|---|---|
| 2014/0060794 A1* | 3/2014 | Ishii | F28D 20/02 165/201 |
| 2014/0197772 A1* | 7/2014 | Morita | H02P 27/08 318/503 |
| 2014/0207273 A1* | 7/2014 | Tsutsumi | G05B 19/4063 700/177 |
| 2014/0361721 A1* | 12/2014 | Yamaguchi | G01K 7/427 318/472 |
| 2015/0295532 A1* | 10/2015 | Sakai | F04B 49/065 318/472 |
| 2017/0016958 A1* | 1/2017 | Saito | H02P 3/22 |
| 2017/0264233 A1* | 9/2017 | Yamawaki | H02P 29/68 |

FOREIGN PATENT DOCUMENTS

| | | |
|---|---|---|
| JP | 6-117393 | 4/1994 |
| JP | 2001-275393 | 10/2001 |
| JP | 2005-33972 | 2/2005 |
| JP | 2012-170200 | 9/2012 |
| JP | 2017-124473 | 7/2017 |

OTHER PUBLICATIONS

Office Action dated Aug. 26, 2020 in corresponding Chinese Patent Application No. 201811536102.X.

* cited by examiner

MOTOR DRIVER AND MOTOR DRIVING SYSTEM

This application is based on and claims the benefit of priority from Japanese Patent Application No. 2017-242704, filed on 19 Dec. 2017, the content of which is incorporated herein by reference.

BACKGROUND OF THE INVENTION

Field of the Invention

The present invention relates to a motor driver and a motor driving system including a plurality of the motor drivers.

Related Art

A conventional motor driver drives a motor by switching a power device and causing a current to flow in the motor (for example, see Patent Document 1). Here, the power device or a nearby circuit generates heat to increase a temperature in a power magnetics cabinet in which the motor driver is installed. In general, a heat exchanger is provided within the power magnetics cabinet as a countermeasure to this issue.

Patent Document 1: Japanese Unexamined Patent Application, Publication No. 2012-170200

SUMMARY OF THE INVENTION

However, if the heat exchange performance of the heat exchanger is constant, the performance of the heat exchanger will be in excess if the quantity of the heat generated by the power device, etc. is small. In this regard, controlling the heat exchanger in response to a temperature in the power magnetics cabinet can reduce power consumption of the heat exchanger. However, this requires a temperature sensor, increasing manufacturing cost.

The present invention is intended to provide a motor driver and a motor driving system which allow a reduction in power consumption of a heat exchanger provided in a power magnetics cabinet while keeping down manufacturing cost.

(1) A motor driver according so the present invention (for example, motor driver 10, 30 described later) is accommodated in a housing (for example, power magnetics cabinet 2 described later) and drives a motor (for example, motor MTR described later). The motor driver comprises: a storage unit (for example, storage unit 12 described later) that stores the quantity of heat generated independently of the value of a current caused to flow in the motor as a first heat quantity; a current detection unit (for example, current detection unit 13 described later) that detects the value of the current caused to flow in the motor; and a heat quantity calculation unit (for example, heat quantity calculation unit 14 described later) that calculates the quantity of heat released to the interior of the housing by adding the first heat quantity stored in the storage unit and a second heat quantity responsive to the value detected by the current detection unit.

(2) In the motor driver described in (1), the storage unit may store the ratio of the quantity of heat released to the interior of the housing to the quantity of heat generated according to the value of the current caused to flow in the motor, and the heat quantity calculation unit may calculate the second heat quantity by multiplying a heat quantity responsive to the value detected by the current detection unit by the ratio stored in the storage unit.

(3) The motor driver described in (1) or (2) may further comprise a notification unit (for example, notification unit 15 described later) that notifies an external device (for example, heat exchanger controller 5 described later) of the heat quantity calculated by the heat quantity calculation unit.

(4) A motor driving system according to the present invention (for example, motor driving system 21 described later) comprises a plurality of the motor drivers described in (1) or (2). The motor driving system may comprise: a control unit (for example, frequency control unit 31 described later) that suppresses the quantities of heat released to the interior of the housing by the motor drivers if the sum of heat quantities calculated by the heat quantity calculation units in corresponding and all the motor drivers exceeds a pre-determined threshold.

(5) The motor driving system described in (4) may comprise a frequency control unit (for example, frequency control unit 31 described later) that reduces a switching frequency as the control unit.

(6) The motor driving system described in (4) or (5) may further comprise an alarm unit (for example, alarm unit 25 described later) that issues an alarm if the sum of heat quantities calculated by the heat quantity calculation units in corresponding and all the motor drivers exceeds a second pre-determined threshold.

The present invention is capable of providing a motor driver and a motor driving system which allow a reduction in power consumption of a heat exchanger provided in a power magnetics cabinet while keeping down manufacturing cost.

DETAILED DESCRIPTION OF THE INVENTION

Figure 1:
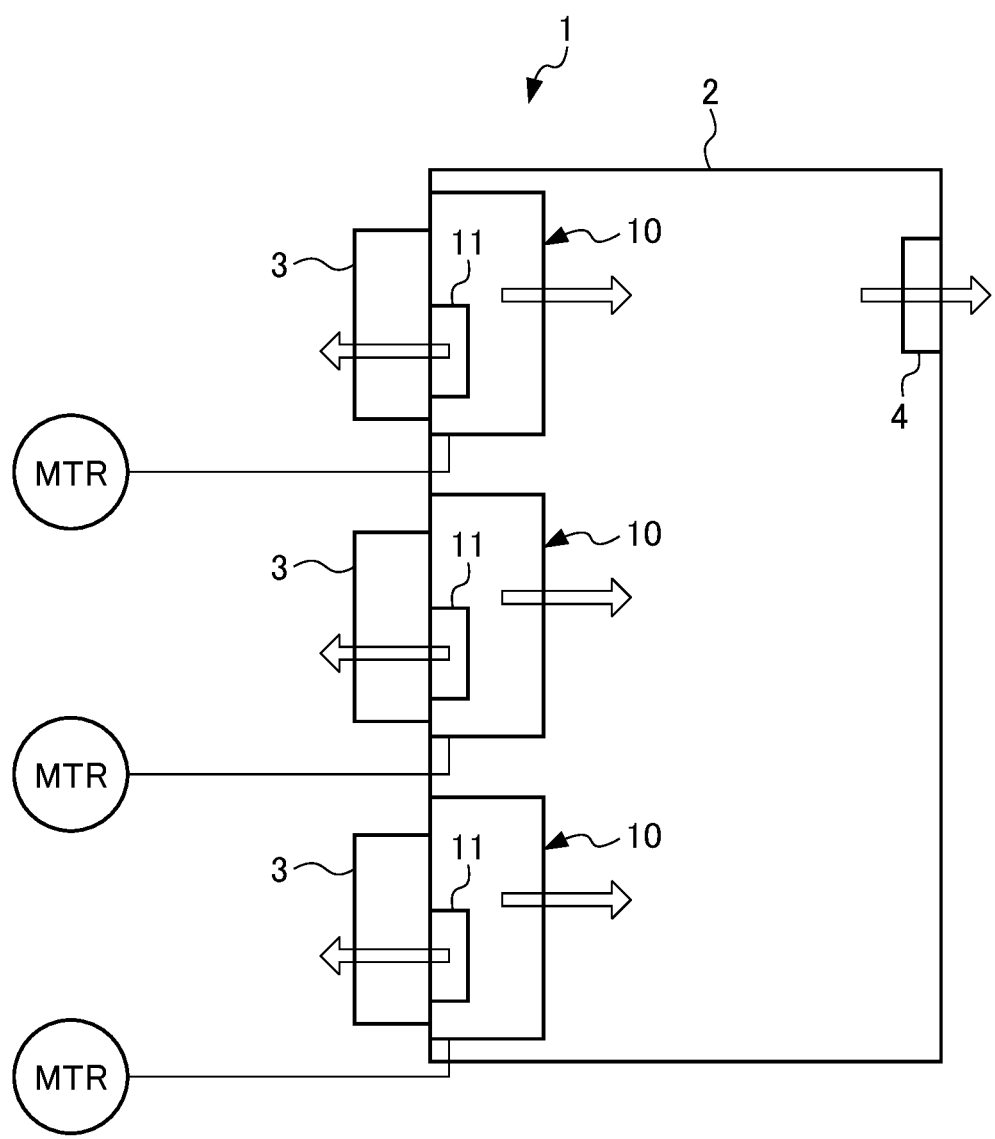
FIG. 1 is a schematic view of a motor driving system according to a first embodiment, of the present invention.

Embodiments of the present invention will be described in detail below while referring to the drawings. In the description of a second embodiment, a structure common to a structure in the first embodiment will be given the same sign and will not be described. In the description of the second embodiment, effects comparable to effects achieved by the first embodiment will not be described.

First Embodiment

Figure 2:
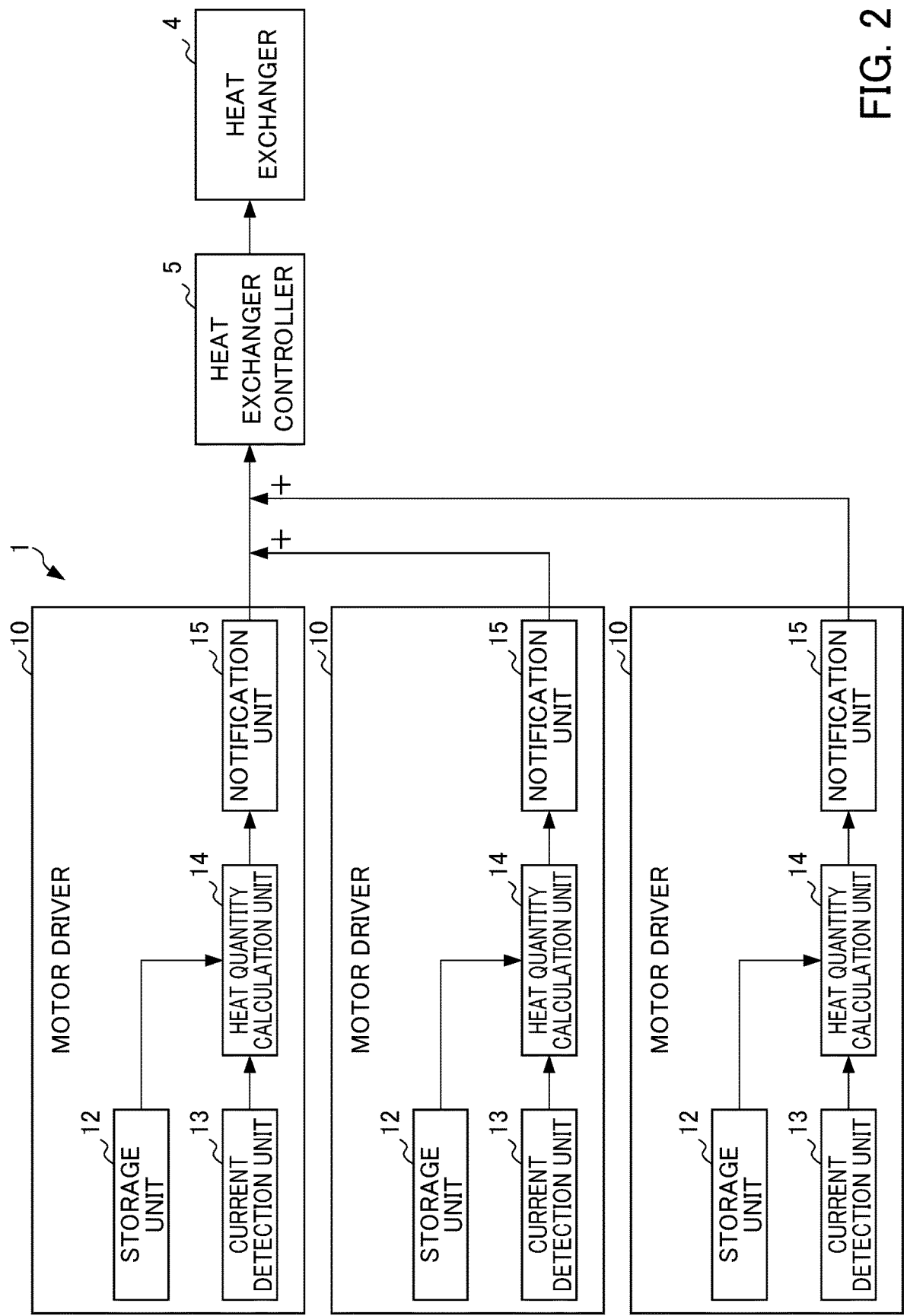
FIG. 2 is a block diagram showing the configuration of the motor driving system in outline shown in FIG. 1.

FIG. 1 is a schematic view of a motor driving system 1 according to a first embodiment of the present invention. FIG. 2 is a block diagram showing the configuration of the motor driving system 1 in outline shown in FIG. 1.

As shown in FIG. 1, the motor driving system 1 is accommodated in a power magnetics cabinet (housing) 2, that stores a circuit, etc. for controlling an NC machine tool. The motor driving system 1 includes multiple motor drivers 10 for driving corresponding motors MTR.

The power magnetics cabinet 2 includes multiple heat sinks 3, a heat exchanger 4, and a heat exchanger controller (external device) 5 (see FIG. 2).

The multiple heat sinks 3 are provided outside the power magnetics cabinet 2 so as to be closely connected to corresponding ones of power devices (IGBTs) 11 of the motor drivers 10. The heat sink 3 releases heat generated by the motor driver 10 to the outside of the power magnetics cabinet 2. The heat sink 3 may be increased in heat release performance by being provided with a fan (not shown).

The heat exchanger 4 is provided in the power magnetics cabinet 2 so as to establish communication between the interior and the outside of the power magnetics cabinet 2. The heat exchanger 4 releases heat to the outside of the power magnetics cabinet 2 after the heat is released to the interior of the power magnetics cabinet 2 by the motor driver 10. The heat exchanger 4 includes a fan (not shown). The rotation of the fan (not shown) is controlled a heat exchanger controller 5 (see FIG. 2).

As shown in FIG. 2, the motor driver 10 includes a storage unit 12, a current detection unit 13, a heat quantity calculation unit 14, and a notification unit 15.

The storage unit 12 stores the following as numerical data to be used by the heat quantity calculation unit 14: a generated heat quantity (first heat quantity) a[W], multiple heat generation coefficients K[W/Arms], and a ratio q. The storage unit 12 outputs the numerical data a[W], K[W/Arms], or q to the heat quantity calculation unit 14 on request.

The generated heat quantity a[W] is the quantity of heat released by a control part for controlling a servo amplifier (not shown), and is constant independently of the value of a current caused to flow in the motor MTR by the servo amplifier. The multiple heat generation coefficients K[W/Arms] are values responsive to the switching frequency of the power device 11 (see FIG. 1). The ratio q is the ratio of the quantity of heat released to the interior of the power magnetics cabinet 2 (see FIG. 1) to the quantity of heat generated by the power device 11 (see FIG. 1), etc. when the servo amplifier (not shown) causes a current to flow in the motor MTR. Specifically, the ratio q is the ratio of the quantity of heat released to the interior of the power magnetics cabinet 2 (see FIG. 1) to the quantity of heat generated according to the value of the current I[Arms] caused to flow in the motor MTR by the servo amplifier (not shown).

The current detection unit 13 detects the value of the current I[Arms] caused to flow in the motor MTR by the servo amplifier (not shown), and outputs the detected value I[Arms] to the heat quantity calculation unit 14.

The heat quantity calculation unit 14 calculates the quantity of heat P[W] released to the interior of the power magnetics cabinet 2 (see FIG. 1) by the motor driver 10 by adding the generated heat quantity a[K] stored in the storage unit 12 and a heat quantity (second heat quantity) obtained by multiplying a heat quantity K[W/Arms]×I[Arms] responsive to the value I[Arms] detected by the current detection unit 13 by the ratio q, and outputs the calculated heat quantity P[W] to the notification unit 15.

Specifically, the heat quantity P[W] calculated by the heat quantity calculation unit 14 is expressed as P[K]×a[W]+q× K[W/Arms]×I[Arms]. For example, assuming a=20[W], q=0.15, K=20, 2[W/Arms], I=22, and 5[Arms], P is calculated to be 88.2[W].

The notification unit 15 notifies the heat exchanger controller 5 of the heat quantity P[W] calculated by the heat quantity calculation unit 14.

Based on the sum of the heat quantities P[W] notified by the notification units 15, the heat exchanger controller 5 controls the rotation of the fan (not shown) provided at the heat exchanger 4. The volume of air Q[m³/s] (rotation number of fan) necessary for heat exchanger 4 is expressed as follows: Q[m³/s]=$P_{total}$[W]/(ρ[kg/m³]×$C_p$[J/(kg·K)]×ΔT [K]). As seen from this expression, Q[m³/s] is proportional to the sum of the heat quantities P[W] notified by the notification units 15. In this expression, $P_{total}$[W] is the sum of the heat quantities P[W] notified by the notification units 15, ρ[kg/m³] is air density (about 1.2 kg/m³), $C_p$[J/(kg·K)] is the specific heat of air at constant pressure (about 1007 J/(kg·K)), and ΔT[K] is a difference between an allowable temperature in the power magnetics cabinet 2 (see FIG. 1) and an outside air temperature.

A path of heat generated by the motor driver 10 will be described next using FIG. 1. Heat generated by the motor driver 10 is released to the outside along a path roughly divided into two paths.

Described first is a path along which heat is released to the outside through the heat sink 3 provided outside the power magnetics cabinet 2. The heat sink 3 is provided outside the power magnetics cabinet 2, so that this path of heat does not contribute to a temperature increase in the power magnetics cabinet 2.

Described next is a path along which heat is released to the interior of the power magnetics cabinet 2. The heat released to the interior of the power magnetics cabinet 2 is released to the outside of the power magnetics cabinet 2 by the heat exchanger 4. If the sum of the quantity of the heat released from the motor driver 10 to the interior of the power magnetics cabinet 2 and the quantity of heat released from a different unit in the power magnetics cabinet 2 exceeds the performance of the heat exchanger 4, a temperature in the power magnetics cabinet 2 increases.

For reference, the following describes a reason why the quantity of heat generated by the power device 11 (see FIG. 1) is proportional to the value of the current I[Arms] caused to flow in the motor MTR (see FIG. 1) by the servo amplifier (not shown). The quantity of heat (loss) generated by the power device 11 (see FIG. 1) is roughly divided into two quantities.

Described first is the quantity of heat (switching loss) generated when switching the power device 11 from on to off or from off to on. The switching loss can be calculated by integrating a value resulting from multiplication of a current and a voltage with respect to switching time. A voltage depending on a power supply voltage is constant independently of a current. Thus, a value obtained by integrating a value resulting from multiplication of a current and a voltage is proportional to the current. For this reason, the switching loss is proportional to the current value I[Arms].

Described next is a heat quantity (steady loss) resulting from the occurrence of a potential difference between the collector and the emitter of the power device 11 (see FIG. 1) when the power device 11 is on. According to the characteristics of the power device 11, the potential difference is substantially constant even in the occurrence of a change in current. For this reason, the steady loss is substantially proportional to the current value I[Arms].

As described above, in the motor driving system 1 according to this embodiment, the heat quantity calculation unit 14 calculates the quantity of heat P[W] released to the interior of the power magnetics cabinet 2 by the power driver 10. Thus, by controlling the heat exchanger 4 in response to the calculated heat quantity P[W], it becomes possible to reduce power consumption of the heat exchanger 4. Additionally, the absence of a temperature sensor in the motor driving system 1 makes it possible to keep down manufacturing cost.

Second Embodiment

Figure 3:
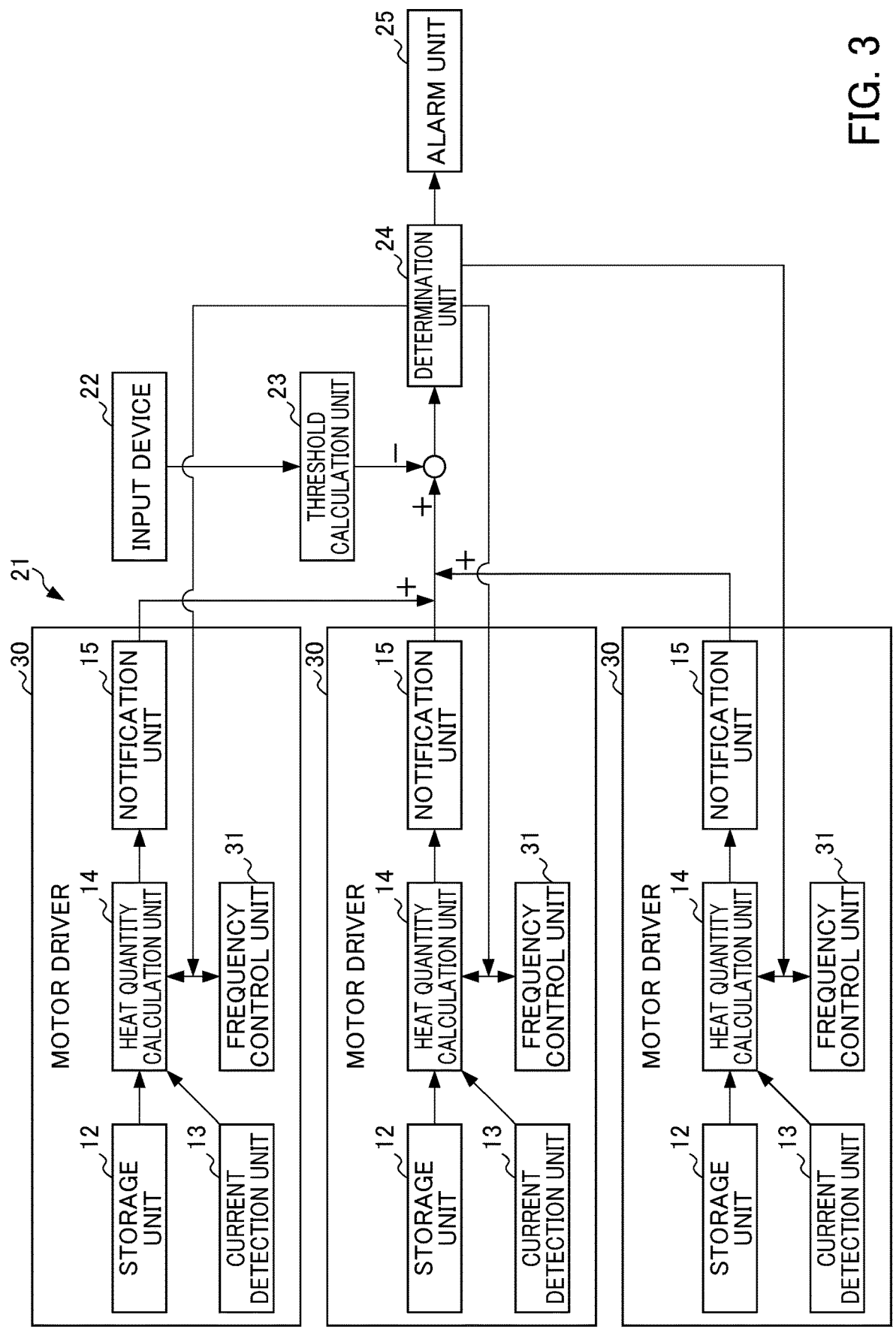
FIG. 3 is a block diagram showing the configuration of a motor driving system in outline according to a second embodiment of the present invention.
Figure 4:
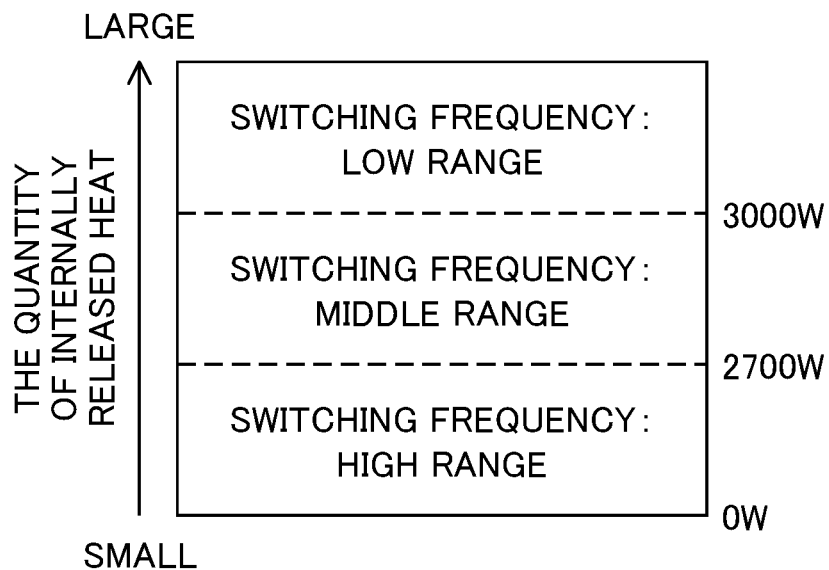
FIG. 4 shows a relationship between a heat quantity calculated by a heat quantity calculation unit and the switching frequency of a power device.
Figure 5:
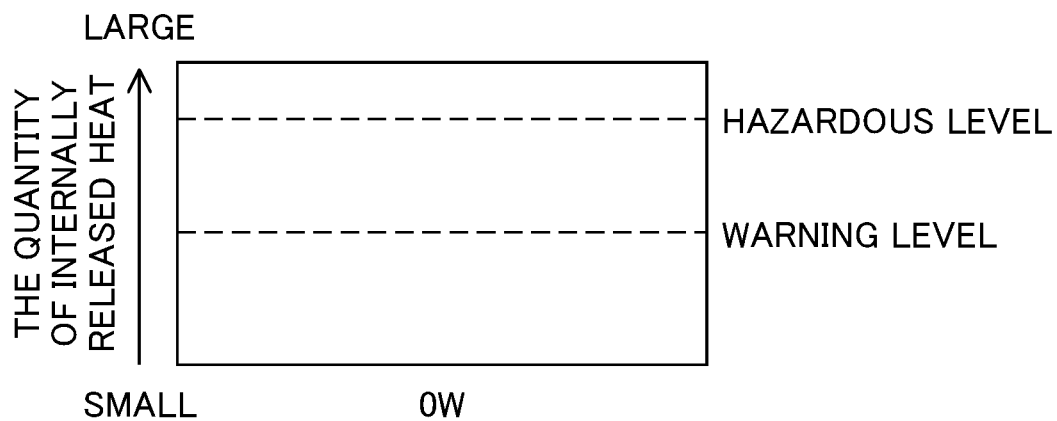
FIG. 5 shows a relationship between a heat quantity calculated by the heat quantity calculation unit and an alarm.

FIG. 3 is a block diagram showing the configuration of a motor driving system 21 in outline according to a second embodiment of the present invention. FIG. 4 shows a relationship between the heat quantity P[W] calculated by the heat quantity calculation unit 14 and the switching frequency of the power device 11 (see FIG. 1). FIG. 5 shows a relationship between the heat quantity P[W] calculated by the heat quantity calculation unit 14 and an alarm.

The second embodiment differs from the first embodiment in the following point, for example. In the motor driving system 21 according to the second embodiment, instead of controlling the heat exchanger 4 in response to the heat quantity P[W] calculated by the heat quantity calculation unit 14, the switching frequency of the power device 11 (see FIG. 1) is changed in response to the heat quantity P[W] calculated by the heat quantity calculation unit 14.

As shown in FIG. 3, the motor driving system 21 includes an input device 22, a threshold calculation unit 23, a determination unit 24, an alarm unit 25, and multiple motor drivers 30. The motor drivers 30 each include a frequency control unit (control unit) 31.

The input device 22 can input a value regarding the performance of a heat exchanger. The input device 22 outputs the input value to the threshold calculation unit 23 in a power magnetics cabinet.

The threshold calculation unit 23 calculates a threshold used for a determination by the determination unit 24 based on the value input from the input device 22 and outputs the calculated threshold as a pre-determined threshold to the determination unit 24. The threshold calculated by the threshold calculation unit 23 includes a threshold (see FIG. 4) for determining a relationship between the heat quantity P[W] calculated by the heat quantity calculation unit 14 and the switching frequency of the power device 11 (see FIG. 1) as well as a threshold (see FIG. 5) for determining a relationship between the heat quantity P[W] calculated by the heat quantity calculation unit 14 and an alarm.

The determination unit 24 outputs commands to the frequency control unit 31, the heat quantity calculation unit 14, and the alarm unit 25 based on a relationship between the sum of the heat quantities P[W] notified from the notification units 15 and a threshold input from the threshold calculation unit 23.

More specifically, if the sum of the heat quantities P[W] notified from the notification units 15 in corresponding and all the motor drivers 30 exceeds the threshold input from the threshold calculation unit 23, the determination unit 24 determines to change the switching frequency of the power device 11 (see FIG. 1). Then, the determination unit 24 outputs a command based on a result of the determination to the frequency control unit 31 and the heat quantity calculation unit 14.

As shown in FIG. 4, for example, if a first-stage threshold (for example, 2700 W) is not exceeded, the determination unit 24 determines not to change the switching frequency and determines to maintain the switching frequency determination unit 24 determines to change the switching frequency to a middle range. If a second-stage threshold (for example, 3000 W) is further exceeded, the determination unit 24 determines to change the switching frequency to a low range.

Description continues by referring back to FIG. 3. The heat quantity calculation unit 14 calculates the quantity of heat P[W] released to the interior of the power magnetics cabinet 2 (see FIG. 1) by the motor driver 30 using the heat generation coefficient K[W/Arms] responsive to the changed switching frequency, and outputs the calculated heat quantity P[W] to the notification unit 15.

If the sum of the heat quantities P[K] notified by the notification units 15 in corresponding and all the motor drivers 30 exceeds the threshold (second threshold) input from the threshold calculation unit 23, the determination unit 24 determines to issue an alarm. Then, the determination unit 24 outputs a command based on a result of the determination to the alarm unit 25.

As shown in FIG. 5, for example, if the first-stage threshold is exceeded, the determination unit 24 determines to issue a warning level alarm. If the second-stage threshold is exceeded further, the determination unit 24 determines to issue a hazardous level alarm.

Description continues by referring back to FIG. 3. If the sum of the heat quantities P[W] notified by the notification units 15 in corresponding and all the motor drivers 30 exceeds the threshold input from the threshold calculation unit 23, the frequency control unit 31 suppresses the quantity of heat released to the interior of the power magnetics cabinet 2 (see FIG. 1) by the motor driver 30 based on the command from the determination unit 24.

As shown in FIG. 4, for example, if the first-stage threshold (for example, 2700 W) is exceeded, frequency control unit 31 reduces the switching frequency of the power device 11 (see FIG. 1) to a middle range. If the second-stage threshold (for example, 3000) is further exceeded, the frequency control unit 31 reduces the switching frequency of the power device 11 (see FIG. 1) to a low range.

Description continues by referring back to FIG. 3. If the sum of the heat quantities P[W] notified by the notification units 15 in corresponding and all the motor drivers 30 exceeds the threshold (second threshold) input by the threshold calculation unit 23, the alarm unit 25 issues an alarm based on the command from the determination unit 24.

As shown in FIG. 5, for example, if the first-stage threshold is exceeded, the alarm unit 25 issues a warning level alarm. If the second-stage threshold is further exceeded, alarm unit 25 issues a hazardous level alarm.

As described above, in the motor driving system 21 according to the present embodiment, the heat quantity calculation unit 14 calculates the quantity of heat P[W] released to the interior of the power magnetics cabinet 2 (see FIG. 1) by the motor driver 30. This makes it possible to suppress the quantity of heat released to the interior of the power magnetics cabinet 2 (see FIG. 1) by the motor driver 30 based on the calculated heat quantity P[W]. This allows prevention of an abnormal temperature increase in the power magnetics cabinet 2 (see FIG. 1) as well as the prevention of a part's failure. Even if the quantity of heat released to the interior of the power magnetics cabinet 2 (see FIG. 1) by the motor driver 30 increases, the switching frequency of the power device 11 (see FIG. 1) is reduced to allow control over the quantity of heat released to the interior of the power magnetics cabinet 2 (see FIG. 1) by the motor driver 30 without the need of stopping the operation of a machine. This eventually achieves an increase in operating rate.

The present invention is not limited to the embodiments described above. The effects described in the embodiments are merely a list of the most preferred effects resulting from the present invention. Effects achieved by the present invention are not limited to those described in the embodiments.

EXPLANATION OF REFERENCE NUMERALS 1, 21 Motor driving system
2 Power magnetics cabinet (housing)
3 Heat sink
4 Heat exchanger
5 Heat exchanger controller (external device)
10, 30 Motor driver
11 Power device
12 Storage unit
13 Current detection unit
14 Heat quantity calculation unit
15 Notification unit
22 Input device
23 Threshold calculation unit
24 Determination unit
25 Alarm unit
31 Frequency control unit (control unit)
MTR Motor

What is claimed is:

1. A motor driver that is accommodated in a housing and drives a motor, the motor driver comprising:
a storage unit that stores a quantity of heat generated independently of a value of a current caused to flow in the motor as a first heat quantity;
a current detection unit that detects the value of the current caused to flow in the motor; and
a heat quantity calculation unit that calculates a quantity of heat released to an interior of the housing by adding the first heat quantity stored in the storage unit and a second heat quantity responsive to the value detected by the current detection unit, wherein
the storage unit stores a ratio of the quantity of heat released to the interior of the housing to a quantity of heat generated according to the value of the current caused to flow in the motor, and
the heat quantity calculation unit calculates the second heat quantity by multiplying a heat quantity responsive to the value detected by the current detection unit by the ratio stored in the storage unit.

2. The motor driver according to claim 1, further comprising a notification unit that notifies an external device of the quantity of heat calculated by the heat quantity calculation unit.

3. A motor driving system comprising:
a plurality of the motor drivers according to claim 1; and
a control unit that suppresses the quantities of heat released to the interior of the housing by the motor drivers if a sum of the quantities of heat calculated by the heat quantity calculation units in all of the motor drivers exceeds a first pre-determined threshold.

4. The motor driving system according to claim 3, wherein the control unit is a frequency control unit that is configured to control a switching frequency.

5. The motor driving system according to claim 3, further comprising an alarm unit that issues an alarm if the sum of the quantities of heat calculated by the heat quantity calculation units in all of the motor drivers exceeds a second pre-determined threshold.

6. The motor driving system according to claim 4, further comprising an alarm unit that issues an alarm if the sum quantities of heat calculated by the heat quantity calculation units in all of the motor drivers exceeds a second pre-determined threshold.

* * * * *